United States Patent
Jeong (10) Patent No.: US 10,737,672 B2
(45) Date of Patent: Aug. 11, 2020

(54) METHOD OF CHANGING ABS CONTROL MODE BY USING ANALYSIS OF DRIVING PATTERN

(71) Applicants: HYUNDAI MOTOR COMPANY, Seoul (KR); KIA MOTORS CORPORATION, Seoul (KR)

(72) Inventor: Jong-Kyu Jeong, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 161 days.

(21) Appl. No.: 15/989,761

(22) Filed: May 25, 2018

(65) Prior Publication Data

US 2019/0161065 A1     May 30, 2019

(30) Foreign Application Priority Data

Nov. 30, 2017   (KR) .................. 10-2017-0163103

(51) Int. Cl.
*B60T 8/176*   (2006.01)
*B60T 8/32*    (2006.01)
(Continued)

(52) U.S. Cl.
CPC .......... *B60T 8/176* (2013.01); *B60T 8/17551* (2013.01); *B60T 8/17616* (2013.01); *B60T 8/321* (2013.01);
(Continued)

(58) Field of Classification Search
CPC .. B60T 8/176; B60T 8/17616; B60T 8/17551; B60T 8/58; B60T 8/321;
(Continued)

(56) References Cited

U.S. PATENT DOCUMENTS

2007/0164606 A1* 7/2007 Goebels .............. B60T 8/17616
                                                    303/140
2015/0266479 A1* 9/2015 Blakeway ............ B60W 10/06
                                                    477/92

FOREIGN PATENT DOCUMENTS

JP    H07-315195 A    12/1995
JP    H10-273029 A    10/1998
(Continued)

OTHER PUBLICATIONS

Yong, Launch Control Explained, Aug. 28, 2015, OpenRoad Auto Group <https://openroadautogroup.com/blog/launch-control-explained> (Year: 2015).*

(Continued)

*Primary Examiner* — Nadeem Odeh
(74) *Attorney, Agent, or Firm* — Morgan, Lewis & Bockius LLP (57) ABSTRACT

A method of changing an anti-lock brake system (ABS) control mode includes: determining, by a controller, whether a first stage of an electronic stability control (ESC) of the vehicle is in an off state and a launch control of the vehicle is in an on state, and determining, by the controller, whether a driver intends to slow down an operation of the ABS installed in the vehicle; and when it is determined that the driver intends to slow down the operation of the ABS, comparing, by the controller, revolutions per minute (RPM) of an engine of the vehicle, a vehicle acceleration speed, a vehicle speed, and a steering angle with predetermined threshold values, respectively, and when each of the comparison results is satisfied, changing, by the controller, an ABS general control mode to an ABS sport control mode which slows down the operation of the ABS.

8 Claims, 7 Drawing Sheets

(51) Int. Cl.
*B60T 8/58* (2006.01)
*B60T 8/1755* (2006.01)
*B60T 8/1761* (2006.01)

(52) U.S. Cl.
CPC ............ *B60T 8/58* (2013.01); *B60T 2220/02* (2013.01); *B60T 2250/00* (2013.01); *B60T 2250/03* (2013.01); *B60T 2250/04* (2013.01); *B60T 2270/10* (2013.01); *B60T 2270/30* (2013.01)

(58) Field of Classification Search
CPC ............ B60T 2220/02; B60T 2270/30; B60T 2250/04; B60T 2250/00; B60T 2270/10; B60T 2250/03
USPC .......................................................... 701/71
See application file for complete search history.

(56) References Cited

FOREIGN PATENT DOCUMENTS

| | | | |
|---|---|---|---|
| JP | 2007-198409 A | 8/2007 | |
| JP | 2008-168700 A | 7/2008 | |
| JP | 2009-052731 A | 3/2009 | |
| JP | 2011-042187 A | 3/2011 | |
| KR | 10-2017-0078237 A | 7/2017 | |
| WO | WO-2007137654 A1 * | 12/2007 | .......... B60T 8/17616 |

OTHER PUBLICATIONS

English Translation: Willmann, WIPO Publication No. WO 2007/137654 A1, Dec. 2007, WIPO Patent Publication (Year: 2007).*

* cited by examiner

<ABS GENERAL CONTROL MODE>

FIG. 7

METHOD OF CHANGING ABS CONTROL MODE BY USING ANALYSIS OF DRIVING PATTERN

CROSS-REFERENCE TO RELATED APPLICATIONS

This application claims the benefit of priority under 35 U.S.C. § 119 to Korean Patent Application No. 10-2017-0163103, filed on Nov. 30, 2017, in the Korean Intellectual Property Office, the disclosure of which is incorporated herein by reference in its entirety.

TECHNICAL FIELD

The present disclosure relates to a method of changing an anti-lock brake system (ABS) control mode by using an analysis of a driving pattern, and particularly, to a method of changing an ABS control mode only by changing a control logic by utilizing an existing system without a separate additional system in, such as, circuit driving.

BACKGROUND

In a case of a hydraulic brake, when a brake pedal is operated, braking hydraulic pressure is applied from a master cylinder, so that braking of a vehicle is performed.

In this case, when braking force larger than static friction force between a road and a tire is applied to the tire, a slip phenomenon, that is, a phenomenon in which the tire slips on the road, is generated. In order to prevent the slip phenomenon and secure stable braking force, an anti-lock brake system (ABS) was developed, and the ABS may detect a slip phenomenon, adjust braking hydraulic pressure according to the detection, and enable a vehicle to stop with the shortest distance.

The ABS may include an electronic control unit (ECU) for controlling electric elements, a plurality of solenoid valves for controlling braking hydraulic pressure transferred to each hydraulic brake, an accumulator, and a hydraulic control device, such as a hydraulic pump. In common, a slip valve is calculated based on a wheel speed detected by a sensor and a speed of a vehicle body estimated from the wheel speed, and when the calculated slip value reaches a predetermined slip valve, the ABS operates.

In relation to this, a method of controlling an ABS for a vehicle according to a related art includes: calculating the amount of slip of a vehicle, calculating the amount of threshold slip for operating an ABS, determining whether the amount of slip is larger than the amount of threshold slip, and controlling the ABS to operate when the case where it is determined that the amount of slip is larger than the amount of threshold slip is continuously generated by the predetermined number of times or more.

However, the related art controls the operation of the ABS only based on the amount of slip, so that the related art has a problem in that the related art cannot determine whether to brake considering a driving state, such as a case where a vehicle travels at a high speed or driving is performed in a circuit.

SUMMARY

The present disclosure has been made in an effort to solve the problems, and an object of the present disclosure is to provide a method of controlling an anti-lock brake system (ABS) by reflecting an intention of a driver even in a situation where a vehicle travels at a high speed or driving is performed in a circuit.

Another object of the present disclosure is to provide a method of changing an ABS control mode only by changing a control logic by utilizing an existing system without a separate additional system.

An exemplary embodiment of the present disclosure, a method of changing an anti-lock brake system (ABS) control mode by analyzing a driving pattern of a vehicle which stops and then starts includes: determining, by a controller, whether a first stage of an electronic stability control (ESC) of the vehicle is in an off state and a launch control of the vehicle is in an on state, and determining, by the controller, whether a driver intends to slow down an operation of the ABS installed in the vehicle; and when it is determined that the driver intends to slow down the operation of the ABS, comparing, by the controller, revolutions per minute (RPM) of an engine of the vehicle, a vehicle acceleration speed, a vehicle speed, and a steering angle with predetermined threshold values, respectively, and when each of the comparison results is satisfied, changing, by the controller, an ABS general control mode to an ABS sport control mode which slows down the operation of the ABS.

The method may further include increasing a permission range of a wheel slip rate or a wheel deceleration speed of the ABS in the ABS sport control mode.

The method may further include confirming whether the first stage of the ESC is maintained in the off state while the vehicle travels in the ABS sport control mode, and determining whether to maintain the ABS sport control mode.

The method may further include when the first stage of the ESC is maintained in the off state, confirming whether to re-start the vehicle, and when the first stage of the ESC is not maintained in the off state, changing the ABS sport control mode to the ABS general control mode.

The method may further include determining whether the RPM of the engine, the vehicle acceleration speed, or the vehicle speed exceeds the predetermined threshold value; and determining whether the steering angle is smaller than the predetermined threshold value.

The vehicle acceleration speed may be calculated by a longitudinal acceleration speed measured by a yaw rate and G-sensor mounted in the vehicle.

In the ABS sport control mode, tire grip force may be changed according to a driving ability of the driver.

The ABS sport control mode may decrease a difference between a changed wheel speed of the vehicle and an adjusted wheel slip rate during braking and decreases a braking distance.

According to the present disclosure including the foregoing configuration, there is an advantage in that it is possible to change the ABS control mode in accordance with a tendency of a driver so as to enable the driver to perform circuit driving.

The present disclosure has an advantage in that it is possible to determine whether to allow a control mode by reflecting an intention of a driver.

DETAILED DESCRIPTION OF THE EMBODIMENTS

Hereinafter, the present disclosure will be described in detail with reference to the contents described in the accompanying drawings. However, the present disclosure is not restricted or limited by exemplary embodiments. Like reference numerals suggested in each drawing designate members which perform substantially the same functions.

The object and the effect of the present disclosure may be naturally understood or may become clearer through the description below, and the object and the effect of the present disclosure are not limited to the description below.

In describing the present disclosure, a detailed explanation of a publicly known technology related to the present disclosure may be omitted so as to avoid unnecessarily obscuring the subject matter of the present disclosure.

Figure 1:
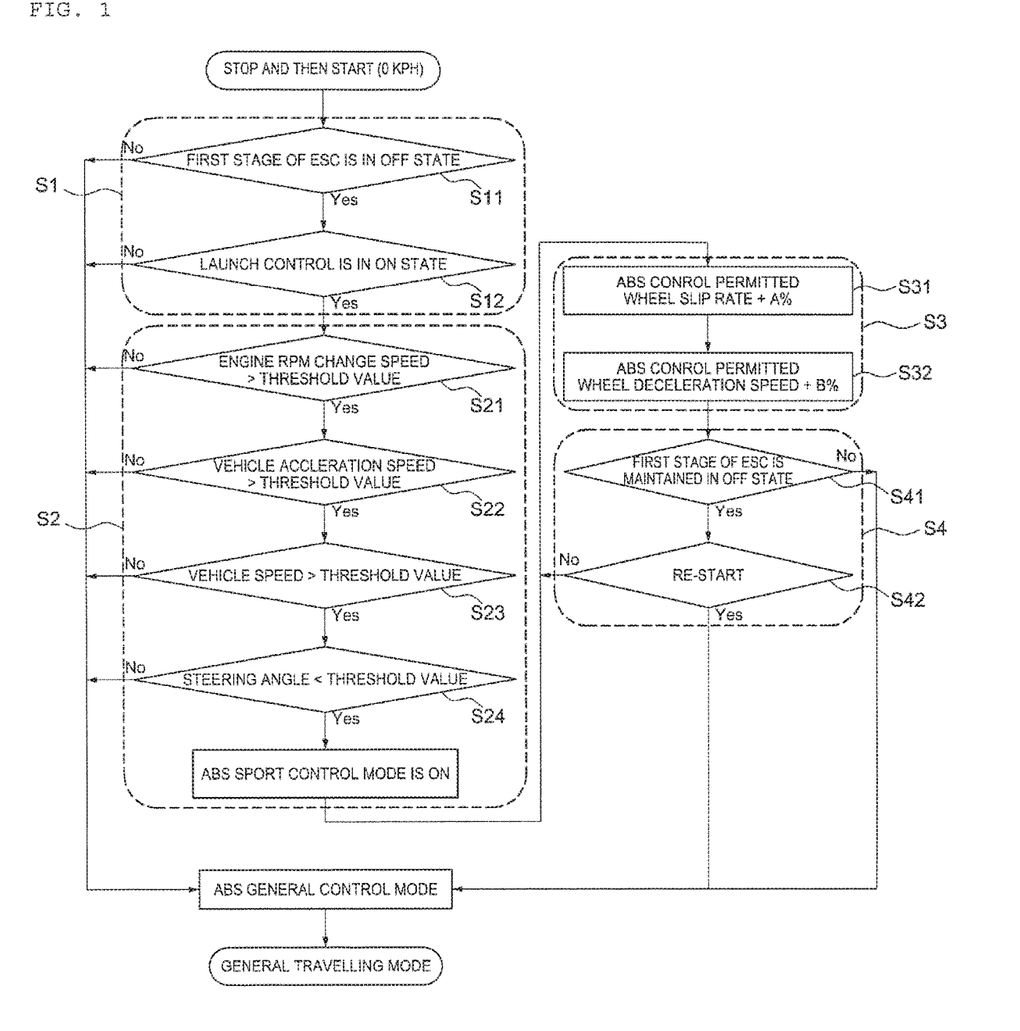
FIG. 1 is a flowchart according to an exemplary embodiment of the present disclosure.

FIG. 1 is a flowchart according to an exemplary embodiment of the present disclosure. Referring to FIG. 1, the present disclosure provides a method of changing an anti-lock brake system (ABS) control mode by using an analysis of a driving pattern, which includes: determining in S1, whether a driver intends to slow down an operation of an ABS installed in a vehicle by confirming, at S11, an off state of a first stage of an electronic stability control (ESC) device of a vehicle and S12, an on state of a launch control; and when it is determined that the driver intends to slow down the operation of the ABS, in S2, comparing revolutions per minute (RPM) of an engine of the vehicle, a vehicle acceleration speed, a vehicle speed, and a steering angle with predetermined threshold values, respectively, and when the comparison results are satisfied, changing an ABS general control mode to an ABS sport control mode which slows down the operation of the ABS.

In the present disclosure, whether the driver intends to slow down the operation of the ABS is evaluated by two manners, and may be determined on the basis of the off state of the first stage of the ESC and the on state of the launch control.

The off state of the first stage of the ESC slows down a function of the ABS or an engine torque control. That is, the off state of the first stage of the ESC first slows down control of a traction control system (TCS). The TCS is a system controlling driving force of a vehicle so as to prevent excessive driving force from being generated and a tire from idling when a vehicle starts or accelerates on a road, such as a snowy road or a rainy road, on which a vehicle easily slips, and is generally connected with various sensors or an actuator to control driving force.

Even when the TCS is not controlled, the ABS or electronic brake force distribution (EBD) may operate. Accordingly, in order to switch the ABS general control mode to the ABS sport mode by a driver for circuit driving, an additional operation is required.

A function of the launch control is a function of increasing the RPM of the engine when the driver steps on a brake and an acceleration pedal at the same time in order to maximally increase power performance when the vehicle starts, and quickly starting the vehicle when the driver takes his/her foot off the brake. The function of the launch control is the function utilized in a stop state for the quick start, when the lunch control is in the on state, it is possible to confirm the intention of the driver that the driver desires to operate the vehicle in the ABS sport control mode, such as circuit driving.

When only the off state of the first stage of the ESC is confirmed, but the on-state of the launch control is not confirmed, there may incur a problem in that the general travelling condition is changed to the ABS sport control mode, so that the control may be desensitized. For example, a beginner driver who lacks awareness of the off state of the first stage of the ESC sharply accelerates or maintains high-speed driving during an unconsciousness operation, so that there may incur a problem in that it fails to intervene sufficient control during sharp braking and thus a braking distance is increased. Accordingly, the present disclosure requires the two conditions in order to reflect an intention of a driver in an aspect of stability.

The present technology may be implemented when it is determined that a current situation is a situation where high-speed travelling or circuit driving is performed through a signal of an existing configuration system by determining driving as circuit driving, more insensitively controlling an ABS control region beside an existing ABS control region, and enabling a driver to easily sense a limit of a vehicle.

In the changing of the ABS general control mode to the ABS sport control mode (S2), an RPM of the engine of the vehicle is compared with a predetermined threshold value (S21), a vehicle acceleration speed is compared with a predetermined threshold value (S22), a vehicle speed is compared with a predetermined threshold value (S23), and a steering angle is compared with a predetermined threshold value (S24).

According to an exemplary embodiment of the present disclosure, the ABS general control mode may be changed to the ABS sport control mode by automatically changing a control mode by using a travelling pattern, not by changing a control mode by using a separate switch for circuit travelling, in consideration of the foregoing matter.

The method of changing the ABS control mode according to an exemplary embodiment of the present disclosure may be performed by a controller such as an electronic control unit (ECU) installed in the vehicle. Such a controller is configured to control various electronic devices of the vehicle, and may include several systems embedded therein to perform necessary functions.

Types of ECU include Electronic/engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, or control module. Taken together, these systems are sometimes referred to as the car's computer (technically there is no single computer but multiple ones). Sometimes one assembly incorporates several of the individual control modules (PCM is often both engine and transmission).

In addition, examples of such ECUs include a door control unit (DCU), an engine control unit (ECU), an electric power steering control unit (PSCU), human-machine interface (HMI), a powertrain control module (PCM), a brake control module (BCM; ABS or ESC), a battery management system (EMS), etc.

Therefore, the method of changing the ABS control mode according to an exemplary embodiment of the present disclosure may perform the functions using the controller which is a well-known hardware device.

Figure 2:
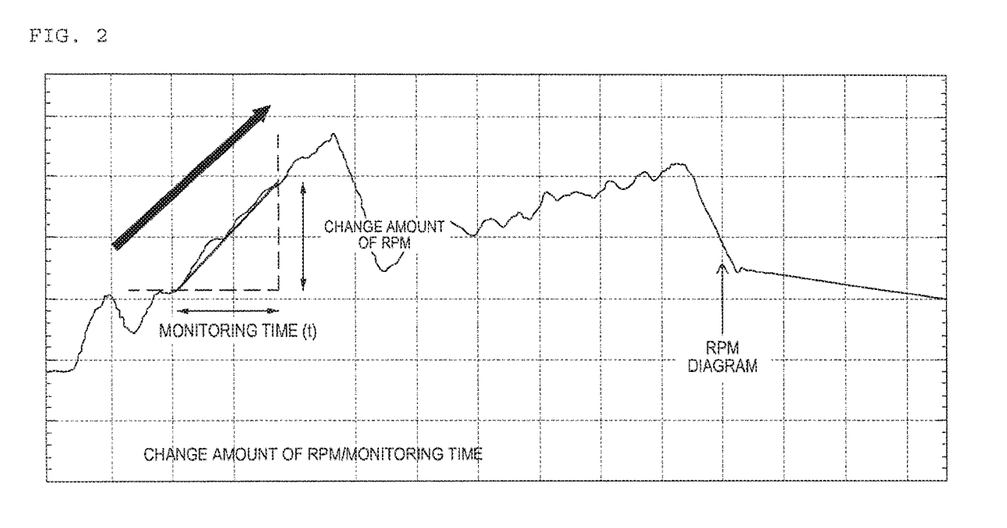
FIG. 2 is a graph illustrating the amount of change in a revolutions per minute (RPM) speed according to an exemplary embodiment of the present disclosure.

FIG. 2 is a graph illustrating the amount of change in an RPM speed according to the exemplary embodiment of the present disclosure. Referring to FIG. 2, the RPM of the engine may be compared with a threshold value by measuring the amount of change in an RPM for a predetermined monitoring time t (S21).

Figure 3:
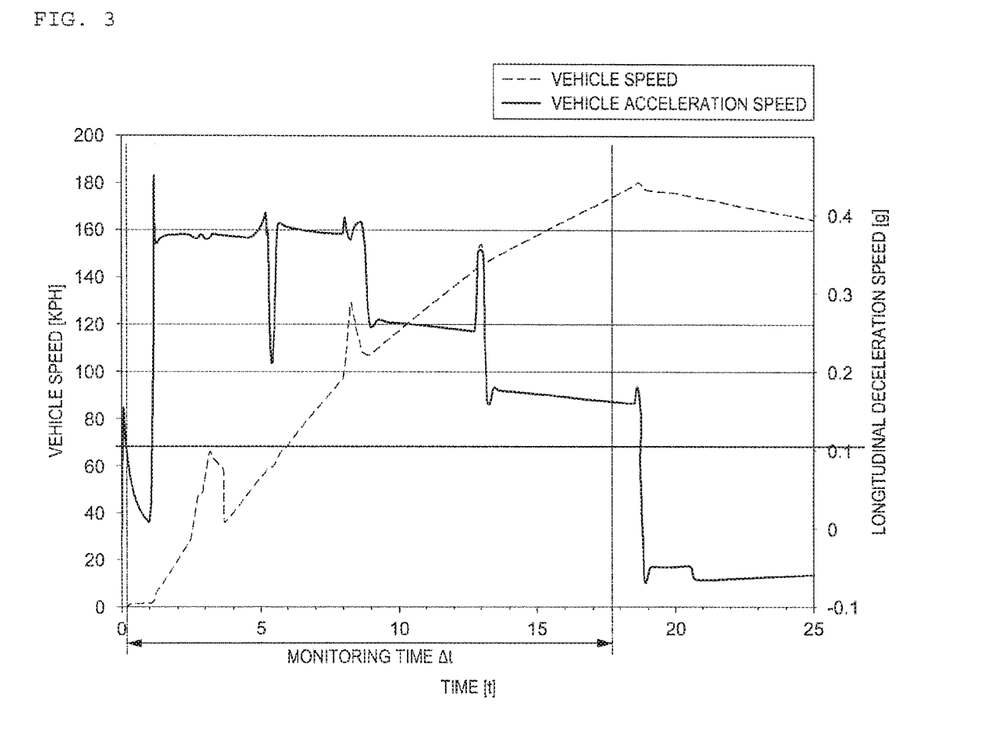
FIG. 3 is a graph illustrating the amount of change in an acceleration speed according to an exemplary embodiment of the present disclosure.

FIG. 3 is a graph illustrating the amount of change in an acceleration speed according to the exemplary embodiment of the present disclosure. Referring to FIG. 3, an acceleration speed of the vehicle may be calculated based on a longitudinal acceleration speed measured by a yaw rate and G-sensor mounted in the vehicle. An acceleration speed may be compared with a predetermined threshold value by measuring the amount of change in an acceleration speed for the predetermined monitoring time t (S22).

Figure 4:
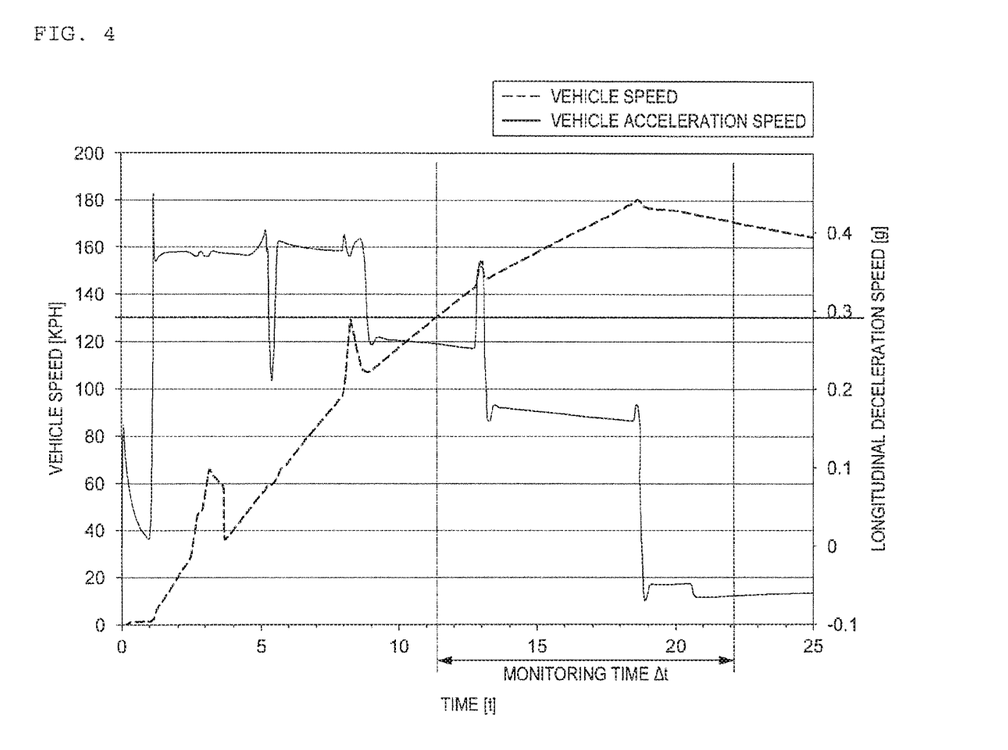
FIG. 4 is a graph illustrating the amount of change in a speed according to an exemplary embodiment of the present disclosure.

FIG. 4 is a graph illustrating the amount of change in a speed according to the exemplary embodiment of the present disclosure. Referring to FIG. 4, a change in a speed of the vehicle may be obtained by comparing a vehicle speed with a predetermined threshold value by measuring the amount of change in a speed for the predetermined monitoring time t (S23).

The changes in the RPM of the engine of the vehicle, the vehicle acceleration speed, and the vehicle speed in FIGS. 2 to 4 are travelling factors to which the intention of the driver for changing the ABS general control mode to the ABS sport control mode is reflected, and whether to change the control mode may be determined by comparing the travelling factors with the predetermined threshold values, respectively.

In order to change the ABS general control mode to the ABS sport control mode, the present disclosure may include an operation of determining whether the engine RPM, the vehicle acceleration speed, or the vehicle speed exceed the predetermined threshold values, respectively, and an operation of determining whether a steering angle is less than a predetermined threshold value.

It may be determined that the current travelling is straight course travelling around a start point of a circuit by determining that the steering angle is equal to or smaller than the predetermined angle for the predetermined time (S24). When the steering angle is maintained to be smaller than the threshold angle for the predetermined time, it may be determined that the driver intends to drive straight.

The monitoring time t and each threshold value set in FIGS. 2 to 4 may be differently set according to each travelling factor. The monitoring time t may be subdivided into t1 to tn for each travelling factor, and each threshold value may also be set to a first threshold value to an $n^{th}$ threshold value according to an environment of the ABS sport control mode in which the driver desires to drive, and is not limited to a specific range and a specific value.

Figure 5:
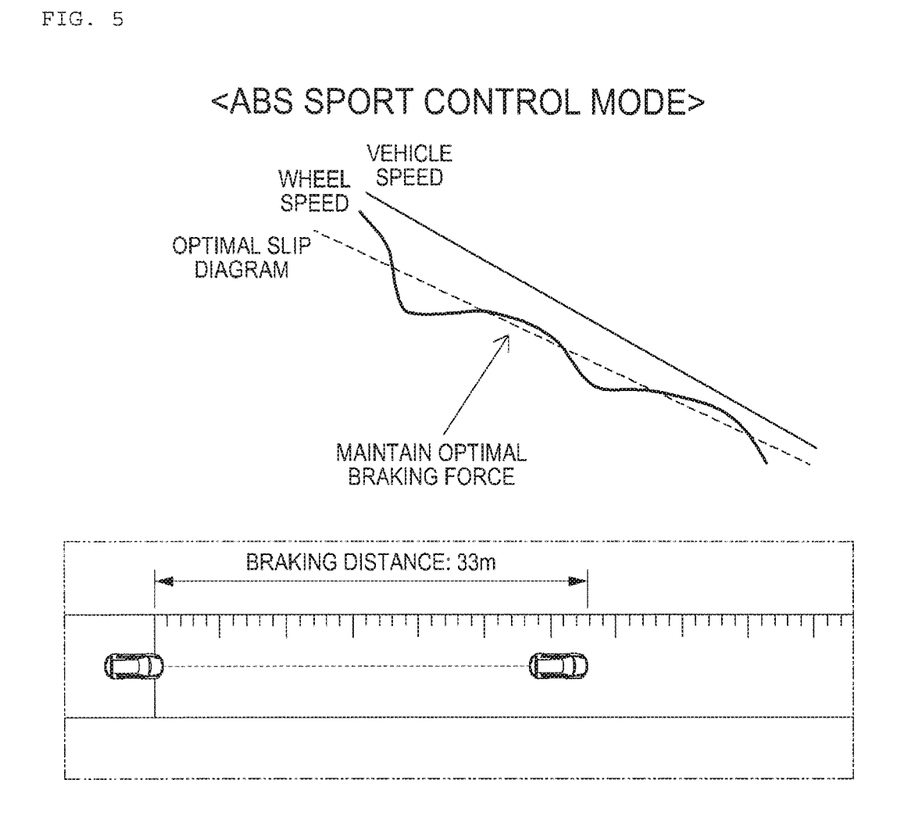
FIG. 5 is a braking distance in an ABS sport control mode according to an exemplary embodiment of the present disclosure.
Figure 6:
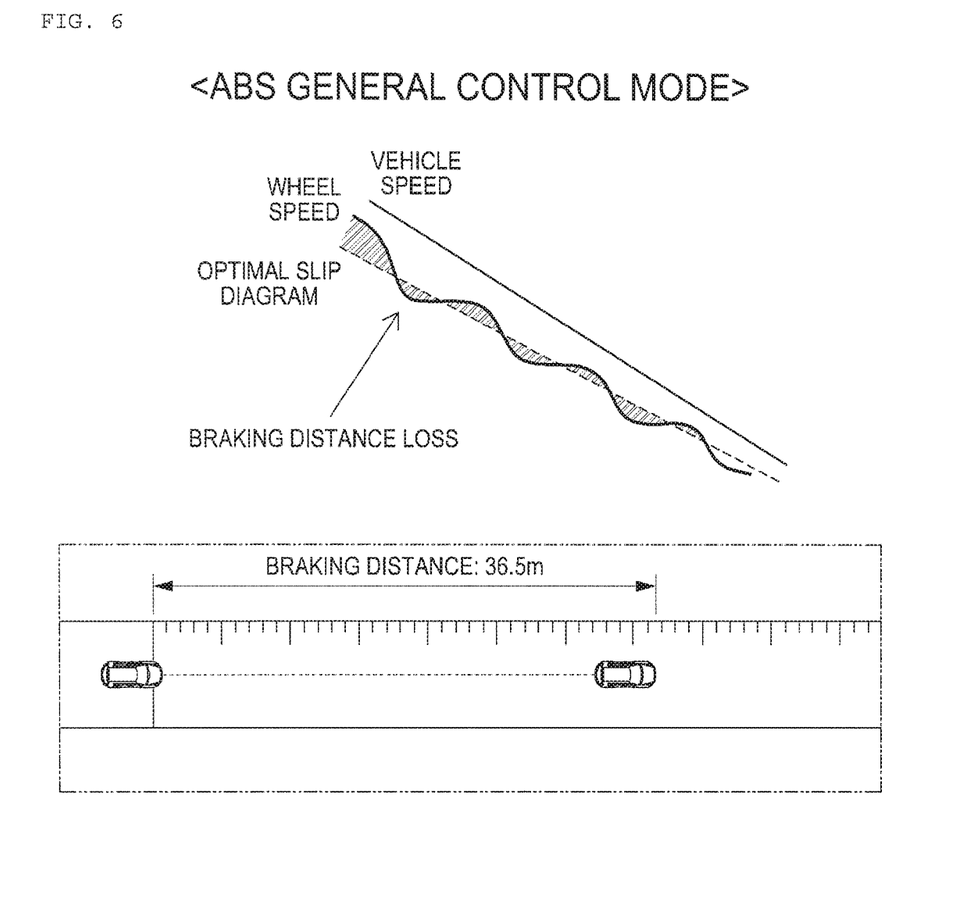
FIG. 6 is a braking distance in an ABS general control mode according to an exemplary embodiment of the present disclosure.

FIG. 5 is a braking distance in the ABS sport control mode according to the exemplary embodiment of the present disclosure, and FIG. 6 is a braking distance in the ABS general control mode according to the exemplary embodiment of the present disclosure.

The method of changing the ABS control mode may further include increasing a permission range of a wheel slip rate or a wheel deceleration speed of the ABS (S3).

After the ABS control mode is changed to the ABS sport control mode, a wheel slip rate at which the ABS control is permitted may be increased (S31) and a wheel deceleration speed at which the ABS control is permitted may be increased (S32).

A % and B % illustrated in FIG. 1 are tuning parameters, or may be correction coefficients. A % and B % represent permission ranges in which the ABS sport control mode is maintainable, and when the vehicle is operated within A % and B %, the ABS sport control mode may be continuously maintained and the ABS sport control mode is not changed to the ABS general control mode.

Referring to FIGS. 5 and 6, the ABS sport control mode is a control mode in which a control intervening time is maximally insensitively changed to enable the vehicle to exert limit performance by an ability of the driver according to each situation. A braking distance may be decreased by decreasing a difference between a changed wheel speed of the vehicle and an adjusted wheel slip rate during the braking according to the state of the vehicle during the ABS control.

An optimal slip diagram indicates an ideal slip rate required according to a travelling state of a vehicle when a vehicle speed is decreased, and a wheel speed is a value changed each time according to a travelling state of a vehicle. The optimal slip diagram is changed according to a travelling state, and a determination on a travelling state may include an influence of a tire temperature, a tire wear condition, a frictional material temperature, a disk temperature, the amount of load movement, a longitudinal deceleration speed, and the like.

When the vehicle speed is decreased, the wheel speed is decreased according to the travelling state, and in this case, the optimal slip diagram is also decreased according to the decrease in the wheel speed. However, the wheel speed may be changed according to braking ability of a driver or limit performance of a vehicle.

As the optimal slip diagram and the amount of difference in the wheel speed are increased, a braking distance is also increased, and when the ability of the driver is exerted in the ABS sport control mode, a braking distance may be decreased beside a braking distance in the ABS general control mode.

Figure 7:
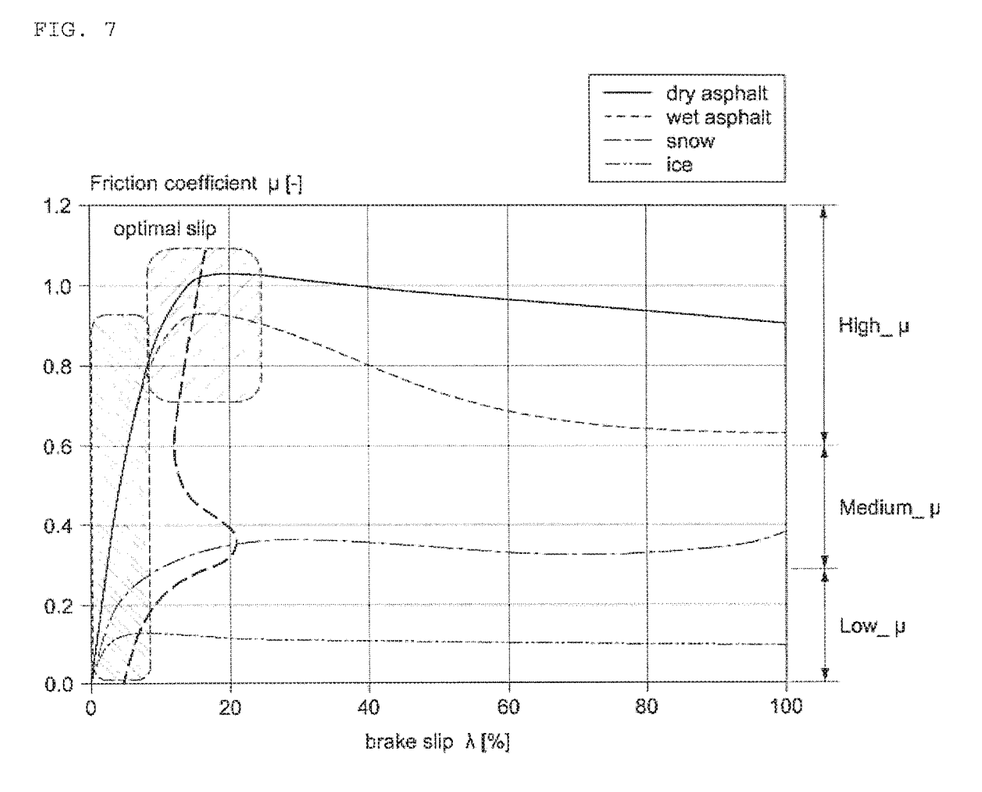
FIG. 7 is a graph illustrating optimal tire grip force according to each control mode and each road state according to an exemplary embodiment of the present disclosure.

FIG. 7 is a graph illustrating optimal tire grip force according to each control mode and each road state according to the exemplary embodiment of the present disclosure. Referring to FIG. 7, a region in which a brake slip rate is small is the ABS general control mode, and a region in which a brake slip rate is larger is the ABS sport control mode.

An optimal slip section may be continuously changed according to a change in a travelling factor during the circuit driving, and in the ABS sport control mode, optimal tire grip force may be maintained according to a skill of a driver. In the existing ABS general control mode, the travelling may be performed only with a set threshold value, but in the present disclosure, a driver may directly change the ABS general control mode.

The present disclosure may include, in S4, confirming whether to re-start the vehicle when the first stage of the ESC is continuously maintained in the off state while the vehicle travels in the ABS sport control mode (S42), and when the first stage of the ESC is not maintained in the off state, changing the ABS sport control mode to the ABS general control mode (S41).

When the driver does not maintain the off state of the first stage of the ESC, the driver does not intend to continuously perform the circuit driving, so that it prohibits the braking from slowing down, and in this case, the ABS sport control mode is changed to the ABS general control mode.

In the foregoing, the present disclosure has been described in detail with reference to the representative exemplary embodiment, but those skilled in the art may understand that the exemplary embodiment may be variously modified without departing from the scope of the present disclosure. Accordingly, the scope of the present disclosure shall not be defined while being limited to the aforementioned exemplary embodiment, but shall be defined by all of the changes or modified forms derived from the equivalent concepts to the claims, as well as the claims to be described below.

What is claimed is:

1. A method of changing an anti-lock brake system (ABS) control mode by analyzing a driving pattern of a vehicle which stops and then starts, the method comprising:
   determining, by a controller, whether a first stage of an electronic stability control (ESC) of the vehicle is in an off state and a launch control of the vehicle is in an on state, and determining whether a driver of the vehicle intends to slow down an operation of an anti-lock brake system (ABS) installed in the vehicle; and
   when it is determined that the driver intends to slow down the operation of the ABS, comparing, by the controller, revolutions per minute (RPM) of an engine of the vehicle, a vehicle acceleration speed, a vehicle speed, and a steering angle with predetermined threshold values, respectively, and when each of the comparison results is satisfied, changing, by the controller, an ABS general control mode to an ABS sport control mode which slows down the operation of the ABS.

2. The method of claim 1, further comprising:
   increasing, by the controller, a permission range of a wheel slip rate or a wheel deceleration speed of the ABS in the ABS sport control mode.

3. The method of claim 1, further comprising:
   confirming, by the controller, whether the first stage of the ESC is maintained in the off state while the vehicle travels in the ABS sport control mode, and determining, by the controller whether to maintain the ABS sport control mode.

4. The method of claim 3, further comprising:
   when the first stage of the ESC is maintained in the off state, confirming, by the controller, whether to re-activate the ESC function, and when the first stage of the ESC is not maintained in the off state, changing, by the controller, the ABS sport control mode to the ABS general control mode.

5. The method of claim 1, further comprising:
   determining, by the controller, whether the RPM of the engine, the vehicle acceleration speed, or the vehicle speed exceeds the predetermined threshold value; and
   determining, by the controller, whether the steering angle is smaller than the predetermined threshold value.

6. The method of claim 5, wherein the vehicle acceleration speed is calculated by a longitudinal acceleration speed measured by both of a yaw-rate sensor and a G-sensor mounted in the vehicle.

7. The method of claim 1, wherein in the ABS sport control mode, tire grip force varies by different drivers.

8. The method of claim 1, wherein the ABS sport control mode decreases a difference between a changed wheel speed of the vehicle and an adjusted wheel slip rate during braking and decreases a braking distance.

* * * * *